United States Patent
Sherrick et al.

[15] 3,679,173
[45] July 25, 1972

[54] SELF-ALIGNING TENSIONER

[72] Inventors: Ronald E. Sherrick; John C. Singleton, both of Lancaster, Ohio

[73] Assignee: Diamond Power Specialty Corporation, Lancaster, Ohio

[22] Filed: Aug. 6, 1970

[21] Appl. No.: 61,619

[52] U.S. Cl. ............................................. 254/29 A, 29/252
[51] Int. Cl. ........................................................ B25b 21/00
[58] Field of Search .................. 29/240, 243.5, 252, 271; 81/54, 53.2; 254/29 A

[56] References Cited

UNITED STATES PATENTS 3,099,434  7/1963  DeMart ............................ 254/29 A Primary Examiner—Andrew R. Juhasz
Assistant Examiner—Michael Koczo, Jr.
Attorney—Harness, Dickey & Pierce

[57] ABSTRACT

A hydraulic tensioner for preloading threaded studs or bolts has a cylinder and piston assembly at the top with a spherically concaved bottom surface overlying a matching spherically convex top surface of the supporting pedestal. Said assembly is held spaced above the pedestal by counterbalancing springs when the tensioner is unloaded but is pulled down to engage said surfaces when the tensioner is loaded. Said assembly and the drawbar, engagement nut and related components are angularly movable.

12 Claims, 3 Drawing Figures

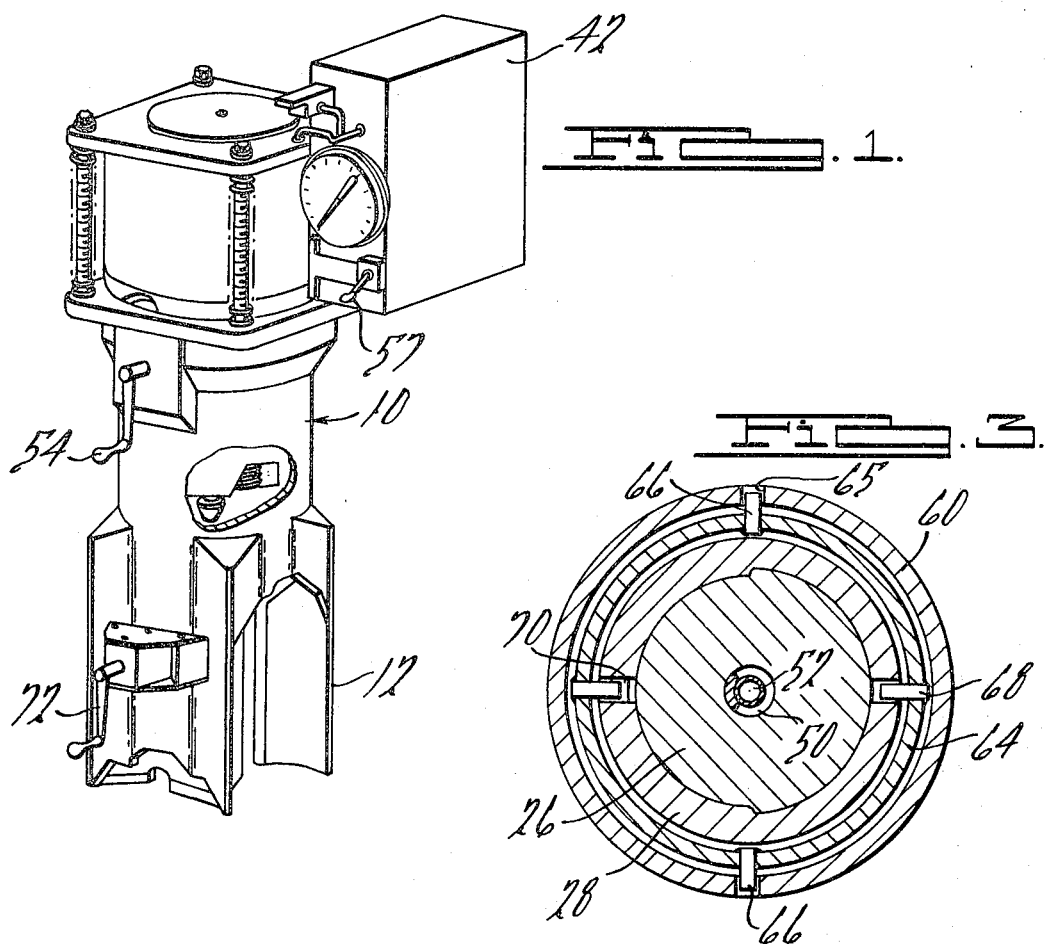

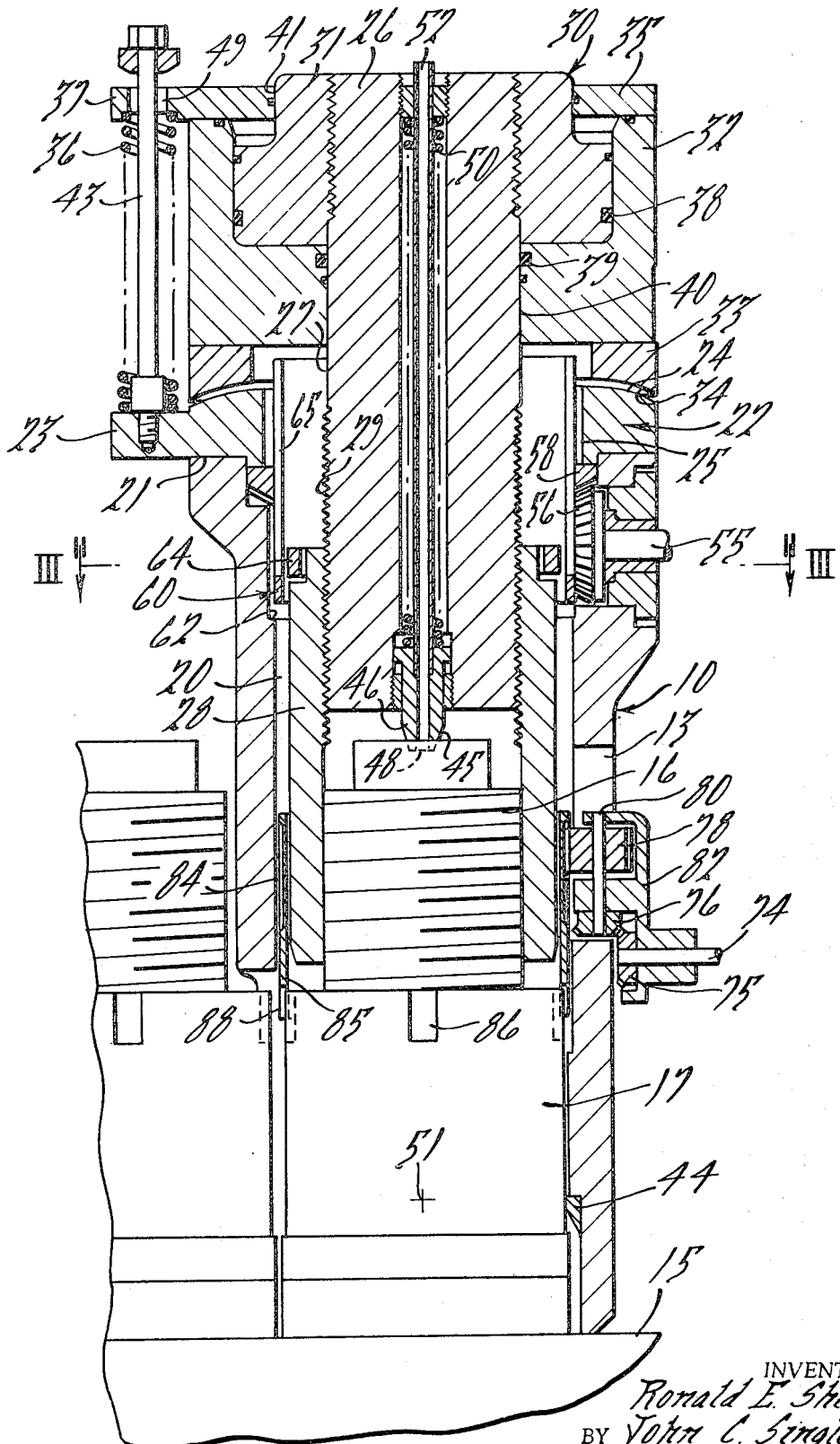

SELF-ALIGNING TENSIONER

BACKGROUND OF THE INVENTION

Tensioning devices for preloading threaded studs and bolts must often be used in spaces which are very limited in proportion to the diameters of the studs and nuts. On large pressure vessels, having studs which may be 6" or more in diameter, there may be spacing of only fractions of an inch between adjacent nuts. Tensioning devices commonly employed for accurately preloading the studs in order to insure uniform tensioning are therefore normally constructed with hollow pedestals designed to straddle a nut and bear against the flange or surface to be bolted, and to extend upwardly to a wider space thereabove, hydraulic tensioning means being provided in such larger space at the top of the pedestal. Even in the space above the studs, however, the available working area may be restricted, and it has been difficult to provide room for powerful tensioning apparatus within the space available in some instances. Since the apparatus is heavy and must be handled with a crane hoist or the like, and close axial alignment of the nut engaging and tensioning apparatus with respect to a stud and nut is required in order to prevent damaging the threads during initial engagement, various expedients have been employed to assist in aligning the tensioning nut and other parts of the tensioner with the stud and for assuring proper initial engagement.

The present invention has as its overall objective the provision of tensioning apparatus of the indicated character incorporating improved means for assisting accurate initial registry and alignment of the tensioner parts with respect to a stud to be tensioned, while achieving such improved operation by means of apparatus which is more compact and adapted to be accommodated in more limited areas than has heretofore been possible with comparable apparatus of self-aligning character, as well as relatively light in weight and easy to maneuver.

Other objects and advantages will become apparent upon consideration of the present disclosure in its entirety.

BRIEF DESCRIPTION OF THE FIGURES OF DRAWING

FIG. 1 is a perspective view of a stud tensioner constructed in accordance with the present invention;

FIG. 2 is a vertical diametric section of the same on a larger scale;

FIG. 3 is a cross-section taken substantially on line III—III of FIG. 2 and looking in the direction of the arrows, the pedestal being omitted.

DETAILED DESCRIPTION OF THE PREFERRED FORM OF THE INVENTION

Referring now to the drawing, reference character 10 designates generally the pedestal of my preferred tensioner. The lower portion of the pedestal is formed by a plurality of spaced legs 12 which may be contoured to provide clearance around adjacent nuts and portions of the apparatus for which the tensioner is intended. Openings between the legs provide windows for observation of the stud and engagement nut, and additional window areas as 13, at higher elevations, may also be provided to enable the operator to determine that proper engagement and disengagement between the stud and pulling parts have occurred.

In FIG. 2 a base flange 15 is indicated, which may be one of a pair of mating flanges of a large pressure vessel or the like, to be secured by a plurality of threaded studs as 16 and nuts 17. In the construction of the vessel, the cover or upper portion carrying the flanged area 15 is initially applied over the studs 16 and the nuts 17 turned down to an engaged but still loose condition ready for final tightening. In FIG. 2 the tensioner assembly is shown in position over a nut and stud which are in such initial engaged but untightened condition.

The interior of the pedestal above the nut 17 consists of a cylindrical chamber 20 which is somewhat larger in diameter than the nut 17 and extends upwardly to a flat top 21 which carries a horizontal cap 22 which is square in outline and the corners of which define projecting flanges 23. Cap 22 has an annular upwardly convex spherical top surface 24 which is concentric with the axis of the assembly and which has an axial opening 25 therein forming a continuation of the space 20.

The drawbar assembly 26 extends downwardly through the opening 25 and includes a tensioning nut 28 threaded thereon and adapted to project therefrom to engage the stud 16. The upper end of the drawbar is rigidly attached to a piston 30 accurately slidably fitted in a hydraulic cylinder 32 the bottom surface of which carries an annulus 33 having a spherically concaved bottom surface 34 facing and matching the surface 24. The top closure of the cylinder 32 comprises an attached plate 35 having corners 37 which project laterally of the cylinder and which are in vertical alignment with corner flanges 23 to coact therewith, the corner flanges 23, 37 defining lower and upper spring abutments for four compression springs 36, each of which bears upwardly against the flanged plate 35 and downwardly on the flange 23. The springs 36 counterbalance the weight of the cylinder and piston assembly and drawbar assembly including all of the parts attached thereto, keeping such parts slightly elevated with respect to the pedestal and maintaining a separation between the surfaces 24, 34 when the tensioner is unloaded, although a relatively small force, of the order of 30 pounds, is sufficient to compress the springs to the extent necessary to force the surface 34 against the surface 24. The retainer bolts 43 for springs 36 are threaded in corner flanges 23 and extend upwardly through enlarged openings 49 in corner flanges 37, to permit lateral movement and rocking of the cylinder and drawbar assembly. The separation maintained by springs 36 between the surfaces 24, 34 when the tensioner is unloaded is less than the travel of the piston during a tensioning operation.

The pressure fluid space beneath the piston 30 is sealed by a suitable sealing ring 38 on the body of the piston 30 and a ring 39 trapped in the axial cylinder bore 40 through which the cylindrical upper portion 27 of the drawbar 26 extends. Suitable means which is not shown in detail, but which includes a source of hydraulic fluid under high pressure, is provided for selectively delivering and exhausting the fluid to and from the cylinder space beneath the piston. Such hydraulic supply means may be contained in a casing 42 supported on the cylinder 32 and the delivery and exhausting of the fluid is controllable by a valve handle 57 projecting from the casing 42. A reduced upper extension portion 31 of the piston projects slidably through an axial opening 41 in the plate 35, and the drawbar 26 is also exposed at its upper end, for a purpose which will presently be described.

The surface area 29 of the drawbar 26 below the bottom of cylinder 32 is externally threaded for a substantial length, the pitch of such threads corresponding to the pitch of the threads of the stud 16. The hollow cylindrical tensioning nut 28 is internally threaded and threadedly fitted on such lower portion of the drawbar.

Prior to application of the tensioner to a stud, the nut 28 is screwed up within the chamber 20, to a position close to the cylinder. The entire assembly is lowered into position around the stud 16 and nut 17 and is guided into approximate axial alignment by tapered alignment pads 44 in the pedestal legs 12, the nut 28 at this time being spaced above the stud 16. As the apparatus is lowered into position, the conic nose 45 of an axially positioned centering rod 46 engages in a conformably tapered conic pocket 48 axially centered in the top of the stud 16. The centering rod 46 is urged downwardly by a relatively light compression spring 50 housed in the drawbar, so that the centering point can move upwardly in the drawbar as the apparatus comes to rest on the flange 15. An extensometer rod 52 attached to the centering rod 46 extends axially upwardly through the drawbar and through the exposed upper portion 31 of the piston where it is accessible for connection to an extensometer (not shown) by which the extension of the stud may be measured.

Rotation of the tensioning nut 28 to apply it to and remove it from the stud 16 is effected by means of a hand crank 54 carried by a shaft 55 journaled in and projecting radially from the pedestal 10. The inner end of shaft 55 carries a bevel pinion 56 meshing with a ring gear 58 which is secured to the outer periphery of a hollow cylindrical drive tube 60 concentrically rotatably fitted in the chamber 20 and held against axial movement by the bevel ring gear 58 which is held between the pinion 56 and cap 22. Rotation of the drive tube 60 turns a gimbal ring 64 connected thereto by a pair of diametric pins 66 fast in the gimbal ring and vertically slidable, as well as rotatable, in axially extending slots 65 in the drive tube 60. The gimbal ring also carries another pair of diametric pins 68 spaced at 90° from pins 66 and extending radially inwardly into and rotatable in openings 70 in the upper end of the tensioning nut 28.

Rotation of the closure nut 17 is effected by a second hand crank 72 carried by a shaft 74 projecting radially from a lower portion of the pedestal. Crank 72 and shaft 74 actuate through a pair of bevel pinions 75, 76 a spur gear 78 mounted on an axially extending shaft 80 in a gear housing 82 attached to the side of the pedestal. (Of course motors may be used rather than cranks.) Gear 78 extends through an opening between a pair of the pedestal legs into meshing engagement with a conformably toothed portion 84 formed on the outer surface of a wrench tube 85 for the fastening nut 17. The wrench tube 85 is rotatably fitted and rotatable in the space between the lower extremity of the tensioning nut 28 and the pedestal 10 and extends downwardly below the tensioning nut for driving engagement with the main closure nut 17. In the construction illustrated the closure nut is provided with a castellated top 86, the wrench tube 85 being provided with downwardly extending tooth portions 88 interengageable therewith.

The center of radius of spherical surfaces 24, 34 is located close to the surface 15 and on the axis of the assembly, preferably at the elevation of the alignment pads 44. This center is indicated at 51. Sufficient radial clearance is left between the tensioning nut 28 and drive tube 60 and between the other parts, including wrench tube 85 and the pedestal, to permit lateral movement of the entire assembly during the above-described centering action, and also to accommodate any slight axial misalignment which may exist between stud 16 and surface 15, and to allow the wrench tube to fall into engagement with the castellated top of the holding nut 17. The teeth of gear portions 78, 84 are of sufficient radial length to accommodate such lateral movement.

After the assembly has been lowered into place and centered by the centering member 45 with the tensioning nut 28 in the raised position, the tensioning nut is screwed onto the stud by means of the crank 54, so that the parts assume the positioning shown in FIG. 2. Hydraulic pressure is then applied beneath the piston to extend the stud the prescribed amount, whereafter the fastening nut 17 is turned down hand tight by means of the crank 72. The pressure is then relieved, the tensioning nut 28 is unscrewed from the stud by reverse rotation of crank 54, and the assembly is removed and available for subsequent operations.

When the unit will be required to exert high tension on large studs, the cylinder, piston, drawbar, tensioning nut and other highly stressed components are formed of high strength alloys, the piston and cylinder are accurately fitted, the cylinder being smaller in diameter and the hydraulic pressure correspondingly higher than current practice in the trade, so that the weight of the counterbalanced parts and the elastic modulus of the springs may be as low as possible, the springs also being relatively long in proportion to their diameter and easily laterally deflectable, thereby reducing the effort required to maneuver the assembly into alignment with the tensioning nut and reducing the likelihood of thread damage.

This Detailed Description of Preferred Form of the Invention, and the accompanying drawings, have been furnished in compliance with the statutory requirement to set forth the best mode contemplated by the inventor of carrying out the invention. The prior portions consisting of the "Abstract of the Disclosure" and the "Background of the Invention" are furnished without prejudice to comply with administrative requirements of the Patent Office.

What is claimed is:

1. A stud tensioner including a pedestal adapted to straddle and extend above a nut-carrying stud to be tensioned, and a cylinder, piston and drawbar assembly mounted above the pedestal with the drawbar extending down inside the pedestal for engagement with a stud to be tensioned, and having lateral clearance between the drawbar assembly and the pedestal, characterized by resilient supporting means for said assembly reacting downwardly against the pedestal and upwardly on said assembly with a force exceeding the weight of the assembly, said supporting means permitting limited lateral and vertical movement between the assembly and the pedestal.

2. A tensioner as defined in claim 1 including an upward facing convex spherical seat area on the top of the pedestal surrounding and outspaced from the drawbar, a matching downward facing concave spherical seat area on the bottom of the cylinder and overlying the first mentioned seat area, said resilient supporting means holding said seat areas apart a distance which is less than the travel of the piston during a tensioning operation.

3. A tensioner as defined in claim 2 wherein said spherical seat areas are concentric with a common center located centrally of and near the bottom of the pedestal.

4. A tensioner as defined in claim 1 including an upwardly yieldably retractable centering element carried by and extending downwardly from the drawbar and engageable with a stud in the pedestal prior to engagement between the drawbar and stud.

5. A tensioner as defined in claim 1 including a centering element carried by the drawbar for engagement with a stud in the pedestal, and biasing spring means urging the centering element downwardly with a force which is relatively light in proportion to the weight of the tensioner.

6. A tensioner as defined in claim 5 wherein said centering element is axially slidable in and projectable from the bottom of the drawbar, and a rod actuatable by the centering element and extending to a position near and accessible from the top of the tensioner.

7. In a tensioner as defined in claim 1, means for attaching the drawbar to and detaching it from a stud in the pedestal comprising a tensioning nut threadedly attached to and extensible from the bottom of the drawbar to threadedly engage a stud while still threadedly engaged with the drawbar, and means for rotating the tensioning nut comprising a cylindrical rotary drive tube journaled in the pedestal and held against unwanted axial movement and of substantially greater internal diameter than the drawbar and tensioning nut, a gimbal ring rockable but non-rotatively attached to the tensioning nut, means slidably and rockably but non-rotatively connecting the gimbal ring to the drive tube, and means for rotating the drive tube to turn the tensioning nut.

8. A tensioner as defined in claim 7 wherein the drive tube, gimbal ring, and tensioning nut are substantially concentric and substantial radial clearance is provided between the tensioning nut and the gimbal ring, and between the gimbal ring and the drive tube.

9. A tensioner as defined in claim 2 including spring-retaining flange portions extending outwardly from opposite sides of the cylinder, coacting flange portions extending outwardly from opposite sides of the pedestal, and compression springs trapped between said flanges on opposite sides of the tensioner.

10. In a tensioner as defined in claim 1, means for rotating a holding nut on the stud comprising a wrench tube journaled in and near the bottom of the pedestal for rotation upon an axis substantially concentric therewith but having substantial radial clearance with respect to the pedestal and the drawbar assembly and adapted to be drivingly interconnected with such a holding nut, and means for rotating the wrench tube to turn the holding nut including axially extending gear teeth on the periphery of the wrench tube and a spur gear meshing therewith journaled on the pedestal, said gear teeth and the teeth of the spur gear being relatively coarse and of a radial length to permit radial displacement of the wrench tube and pedestal to the extent of the effective clearance therebetween.

11. A tensioner as defined in claim 1 wherein both the piston and drawbar are accurately non-rockably fitted in the cylinder, said resilient supporting means comprising a plurality of helical compression springs peripherally spaced around the cylinder and which are relatively long in proportion to their diameter to permit relatively easy lateral deflection thereof.

12. A tensioner as defined in claim 2 wherein both the piston and drawbar are accurately non-rockably fitted in the cylinder, said resilient supporting means comprising a plurality of helical compression springs peripherally spaced around the cylinder and reacting upwardly against an upper part of the cylinder and downwardly against an upper part of the pedestal.

* * * * *